(12) United States Patent
Krueger et al.

(10) Patent No.: US 6,547,880 B1
(45) Date of Patent: Apr. 15, 2003

(54) FLUID APPLICATOR TIP (75) Inventors: Wallace F. Krueger, Toledo, OH (US); Craig A. Williams, Sylvania, OH (US)

(73) Assignee: Designetics, Sylvania, OH (US)

( * ) Notice: Subject to any disclaimer, the term of this patent is extended or adjusted under 35 U.S.C. 154(b) by 0 days.

(21) Appl. No.: 09/744,137

(22) PCT Filed: Aug. 19, 1999

(86) PCT No.: PCT/US99/19001
§ 371 (c)(1),
(2), (4) Date: Mar. 16, 2001

(87) PCT Pub. No.: WO00/10733
PCT Pub. Date: Mar. 2, 2000

(51) Int. Cl.⁷ .................................................. B05C 1/06
(52) U.S. Cl. .................... 118/264; 118/265; 118/266; 118/270; 401/86; 401/207; 401/261; 401/290
(58) Field of Search ................................. 118/264, 265, 118/266, 267, 268, 270; 427/429; 401/86, 207, 261, 290; 156/290, 292, 308.4, 309.9, 320, 322

(56) References Cited

U.S. PATENT DOCUMENTS 3,473,991 A   10/1969   Ludwig
4,854,993 A   8/1989    Celia
5,871,020 A   2/1999    DeVone

FOREIGN PATENT DOCUMENTS

GB   749012          11/1955
WO   WO 00/10733     3/2000

*Primary Examiner*—Laura Edwards
(74) *Attorney, Agent, or Firm*—Emch, Schaffer, Schaub & Porcello Co., L.P.A.

(57) ABSTRACT

An applicator tip (10) for applying fluid to the surface of an object is disclosed. The applicator tip (10) has a base (13) formed of thermoplastic material having a first surface and a second surface. At least one aperture (25) extends through the base. A fluid supply port (29) is operatively connected to the second surface of the base and is in communication with at least one aperture in the base. A fluid application material (35) is positioned on the first surface of the base. The fluid application material is positioned to receive fluid that passes through the aperture from the fluid supply port. The fluid application material is secured to the first surface of the base by a portion of the base that is caused to be molten and fuses to the fluid application material.

35 Claims, 7 Drawing Sheets

FLUID APPLICATOR TIP

FIELD OF THE INVENTION

The present invention is directed to a fluid applicator tip that is positioned in contact with the surface of an object to which a fluid is being applied. More particularly, the applicator tip is used with a fluid applicator to apply a layer of fluid to the surface of the object during relative movement between the object and the fluid applicator.

One of the primary applications of the applicator tip is the automotive glass industry where the fluid applicator is used to apply various fluids to the edge of the windshield, lights, and back window. The applicator tip will be generally described with regard to this particular automotive application. However, it should be understood that this invention is also suitable for a wide range of other fluid applications. The automotive glass application is only one use and is not meant to limit the scope of the applications for the invention.

DESCRIPTION OF THE PRIOR ART

The invention is particularly adapted for the production of glazing units or window assemblies for automotive vehicles, although it will find utility generally in a great many other fields. Installation of fixed window units in earlier automotive vehicles generally involved manual installation of the glazing unit using suitable mechanical fasteners such as metal clips for securing the unit in the vehicle body, applying sealant around the marginal edges of the glazing unit, and positioning decorative trim strips around the unit to cover the junction between the marginal edges of the glazing unit and the adjacent portions of the vehicle body. Assembly and installation of such units was relatively slow and costly inasmuch as a considerable amount of labor was required. The procedure was not readily adaptable to being speeded up to accommodate increased automobile production line rates, nor was it adapted to being automated.

Efforts to overcome these disadvantages resulted in numerous improved window structures. Thus, unitary window assemblies were developed wherein a sheet of glass was provided with an adjacent peripheral frame, with a casting or gasket of molded material extending between the frame and the peripheral margin of the window to hold the glass sheet within the frame. Fasteners provided at spaced locations along the frame permitted the entire assembly to be guided into position over an appropriate opening in a vehicle and secured to the vehicle as a unit. Such unitary window units reduce the time required and simplify installation in the vehicle opening. However, due to the labor required in manually assembling the frame and gasket on the sheet of glass, the structures are relatively costly.

More recently, in order to eliminate the manual assembly, so-called encapsulated grazing units have been developed wherein individual sheets of glass or laminated glass units are formed with integral frame or gasket members molded and cured in situ by a reaction injection molding (RIM) process. One such process and resulting product is shown and described in U.S. Pat. No. 4,561,625 to Weaver. Such encapsulating glazing units can be fabricated with a minimum of hand labor, and the resulting units can be readily attached to the portions of the vehicle body defining the window openings during assembly of the vehicle.

As described in the aforementioned patent, such encapsulated units are fabricated by disposing a predetermined portion of the marginal periphery of a sheet of transparent material within a mold structure. A polymeric gasket forming material is injected into the mold cavity and cured in situ on the sheet to encapsulate the marginal peripheral edge portion of the sheet. The resulting assembly can then be readily attached to the body portion defining the periphery of a window opening during manufacture and assembly of a vehicle.

Due to the nature of the glass surfaces, it is known that the gasket materials may not form a permanent, long term bond directly to the glass. Thus, they may not maintain adhesion to the glass surface for a length of time consistent with the life of the automobile. Exposure to weather, moisture and sunlight, as well as other factors, may cause the gasket material to loosen from the glass with the passage of time, and ultimately to separate entirely from the glass. In order to improve the adherence of the gasket material to the glass and increase the service life of the encapsulated units to an acceptable level, it has been common practice to apply a coating of a liquid primer material to the affected surface of the glass prior to formation of the gasket thereon. Heretofore, this has been accomplished by manually painting a band of the primer material along the appropriate edge portion of the glass panel. Such a procedure may, for example, utilize a brush periodically dipped in a container of the primer material. The procedures are not satisfactory in that they are time-consuming, labor-intensive and may not result in a satisfactory coating of the primer material. Thus the primer layer, which is generally a urethane material, should be applied as a uniform, continuous, relatively thin band in order to function properly. Should the layer be of excessive thickness, it may separate within the layer along a cleavage plane, resulting in failure of the bond. Of course, if the layer is not of sufficient thickness or if certain areas are not coated, the primer layer would likewise be ineffective for its intended purpose. The primer, and particularly the solvent therefore, may be toxic in nature so that manual application thereof, particularly when using an open container of the primer, may require use of protective equipment by the workers. Such manual application processes also generally result in waste of the primer material and generally messy conditions in the work place. Due to the difficulty in controlling the width of manually applied bands, it may also be necessary to mask the work piece prior to application of the primer material.

Accordingly, there is a need in the industry for a fluid applicator tip that can effectively apply a coating of fluid to an object to overcome the deficiencies of the prior art.

Other objects and advantages of the present invention will become apparent to those skilled in the art upon a review of the following detailed description of the preferred embodiments and the accompanying drawings.

SUMMARY OF THE INVENTION

An applicator tip for applying fluid to the surface of an object is disclosed. The applicator tip has a base formed of plastic material having a first surface and a second surface. At least one aperture is extending through the base. A fluid supply port is operatively connected to the second surface of the base, the supply port is in communication with the at least one aperture in the base. A fluid application material is positioned on the first surface of the base. The fluid application material is positioned to receive fluid that passes through the aperture from the fluid supply port. The fluid application material is positioned to apply the fluid to the desired areas on an object. The fluid application material is secured to the first surface of the base by a portion of the base that is caused to be molten and fuses to the fluid application material.

The applicator tips set forth in this patent application are particularly suitable for use in automated or robotic applications that apply a coating material in a manner that has a very fast linear velocity. In such applications, the applicator tips must be designed to have a limited fluid reservoir or fluid holding capacity so that the tips have a quick response when the application of fluid is reduced, such as is necessary when traveling around a corner on an object that is being coated. The reduced fluid holding capacity is achieved by minimizing the thickness in volume of the fluid application material.

Prior applicator tips have been made with a large volume of felt, foam or other composite wicking material as a fluid application material to provide a very resilient pad for liquid deposition onto the object that is to be coated. The large pillow-like surface is required because the applicator tip is pressed manually against the surface of the object and is manually made to traverse the area of the object that is to be coated. The force and speed at which the prior applicator tips are used varies considerably from worker to worker and require a large holding capacity in the fluid application material. The consistent high speed and light touch of automated application systems, such large holding capacity for the fluid application material is neither necessary nor desirable.

DETAILED DESCRIPTION OF THE PREFERRED EMBODIMENTS

This invention relates to an applicator tip for applying fluid to the surface of an object. More particularly, the applicator tip has a base and a fluid application material positioned on the base. The fluid application material is thermally bonded to the base in selected locations.

The fluid applicator tip 10, as shown in FIGS. 1–4, is designed for applying fluid to the surface of an object (not shown). The applicator tip applies fluid to the object in the manner disclosed in U.S. Pat. No. 5,131,349 and this patent is hereby incorporated by reference into this patent application. The fluid applicator tip 10 has a base 13 that is preferably formed of a thermoplastic material such as HDPE or polypropylene. The base 13 has a first surface 17 and a second surface 19. In most applications, the base is relatively flat and thin and can have almost any geometric shape. However, it has been found particularly desirable to utilize a circular or rectangular shape for the base 13. A rim 14 is positioned around the outer perimeter of the base 13. The rim 14 extends from the base in a direction that is perpendicular to the first surface 17.

The first surface 17 of the base 13 has at least one raised portion 23 that is located adjacent the outer perimeter of the base 13. In certain embodiments, the raised portion 23 can substantially extend around the perimeter of the base 13. The raised portion 23 is formed of the same thermoplastic material that is used to form the base 13. In certain applications, it has been found preferable for the raised portion 23 to have a generally pyramid shape with the base of the pyramid positioned on the first surface 17.

At least one aperture 25 extends through the base 13. It is to be understood, that a plurality of apertures can extend through the base. A fluid supply port 29 is operatively connected to the second surface 19 of the base 13. The supply port 29 defines a passageway 31 for supplying fluid to the applicator tip 10. The supply port 29 is positioned so that the passageway 31 is in communication with the aperture 25 and the base 13. The passageway 31 can be larger in diameter than the aperture 25. The supply port 29 is normally formed of the same thermoplastic material used to form the base 13 and can be integrally molded as part of the base 13.

Figure 1:
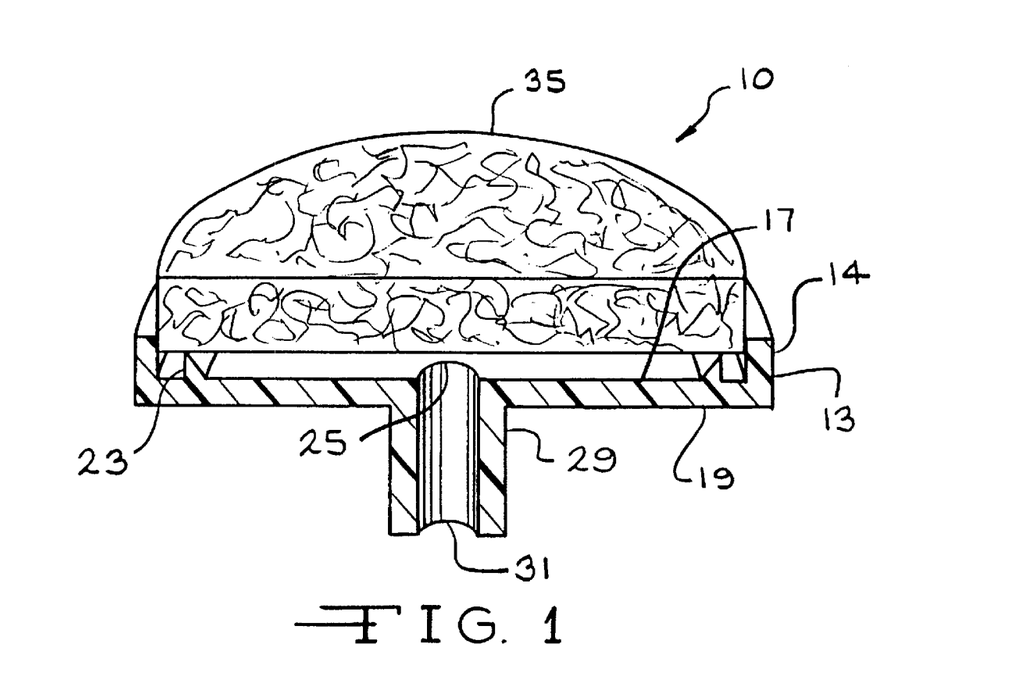
FIG. 1 is a partial cross-sectional perspective view of the applicator tip of the present invention.
Figure 2:
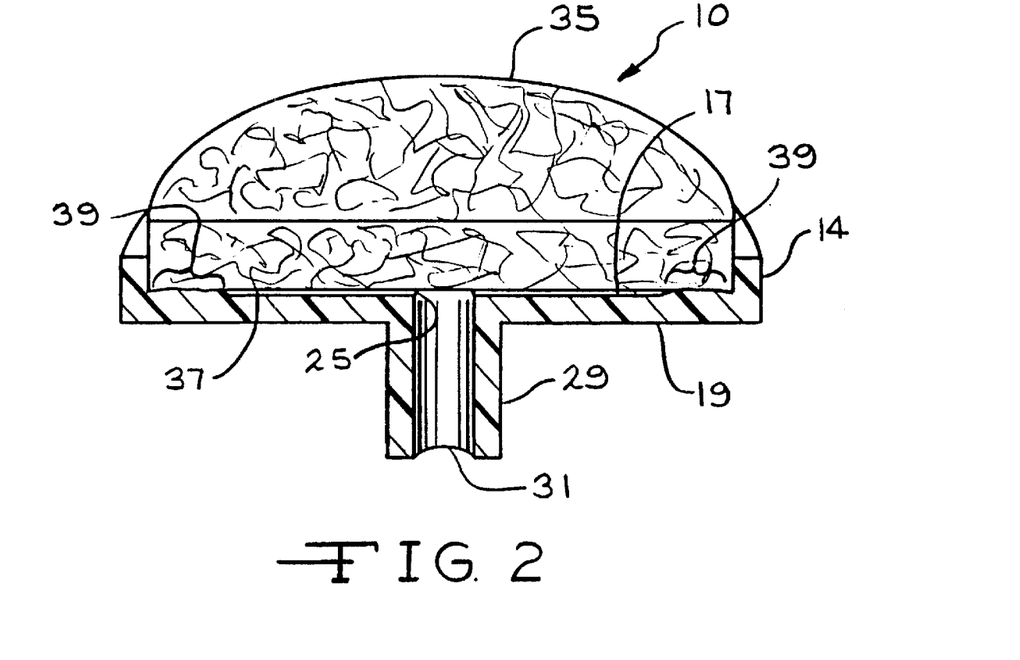
FIG. 2 is a partial cross-sectional perspective view of the invention.
Figure 3:
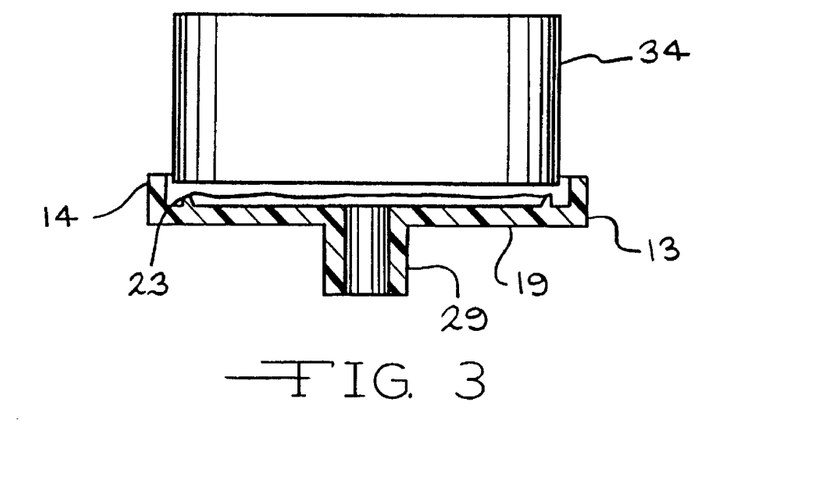
FIG. 3 is a cross-sectional view of a feature of the invention.
Figure 4:
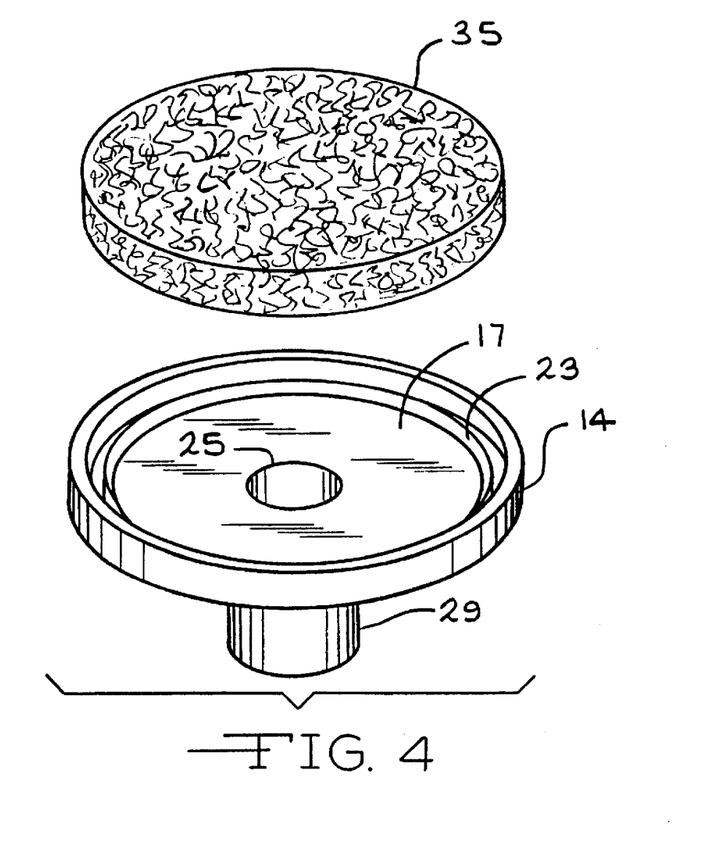
FIG. 4 is an exploded perspective view of the invention.

A fluid application material 35 is positioned on the first surface 17 of the base 13. The fluid application material 35 is usually a porous wicking material such as organic or synthetic fibers, felts, foams or other suitable materials. The fluid application material is usually designed to cover the entire first surface 17 of the base 13. The fluid application material 35 is secured to the base 13 by a thermal bonding process. In this process, the first surface 17 of the base 13 is subjected to a source of heat 34, as shown in FIG. 3, that is sufficient to cause the raised portion 23 on the first surface 17 of the base 13 to at least partially melt or become molten. The source of heat 34 is positioned immediately adjacent the raised portion 23 and the heat from the source 34 is transferred to the raised portion 23. When the raised portion 23 is in the molten or semimolten state, the fluid application material 35 is positioned on the first surface 17. As the fluid application material 35 comes into contact with the heated raised portion 23, the raised portion 23 is caused to spread out or flow and at least partially penetrates or wicks into the fluid application material 35 to bond the fluid application material 35 to the base 13. As shown in FIG. 2, the raised portion 23 has spread out and at least partially penetrated or fused with the fluid application material 35 as shown in the region 39 to secure the fluid application material 35 to the base 13. In most applications, the raised portion 23 extends substantially around the outer perimeter of the base 13 and this results in a region 39 where the fluid application material 35 is secured to the portion of the base 13 that substantially extends around the outer perimeter of the base. In most applications, the raised portion 23 is formed from the same material that is used to form the base 13. In practice, it has been found to be preferable for most uses if the height of the raised portion 23 is from about 0.005 to about 0.090 inches and the width of the raised portion is from about 0.005 to about 0.090 inches.

In operation, fluid from a fluid dispensing system as described in U.S. Pat. No. 5,131,349, which is hereby incorporated by reference, is supplied to the passageway 31 in the supply port 29. The fluid passes through the aperture 25 and is distributed through the fluid application material 35 due to the wicking action of the material 35. In addition, since the fluid application material 35 is secured to the base 13 around the outer perimeter of the base, as shown in FIG. 2, the pressure of the fluid passing through the aperture 25 can cause the fluid application material 35 to move away from the first surface 17 of the base 13 in the area located between the aperture 25 and the region 39 where the fluid application material is secured to the base 13. When the fluid application material 35 moves away from the first surface 17 of the base 13, this allows the fluid to flow into a space 37 between the base 13 and the fluid application material 35. The fluid thereby comes into contact with a larger portion of the fluid application material 35 and more readily wets out the fluid application material. When the fluid application material 35 is sufficiently saturated with the fluid, the applicator tip 10 can be brought into contact with the desired surface of the object (not shown) to be coated in a manner previously described.

In many uses of an applicator tip, it is desirable to have a shape that contacts or interacts with more than one surface of the object that is to be coated with the fluid. Other shapes can easily be formed from the applicator tip as previously described.

Figures 7, 8:
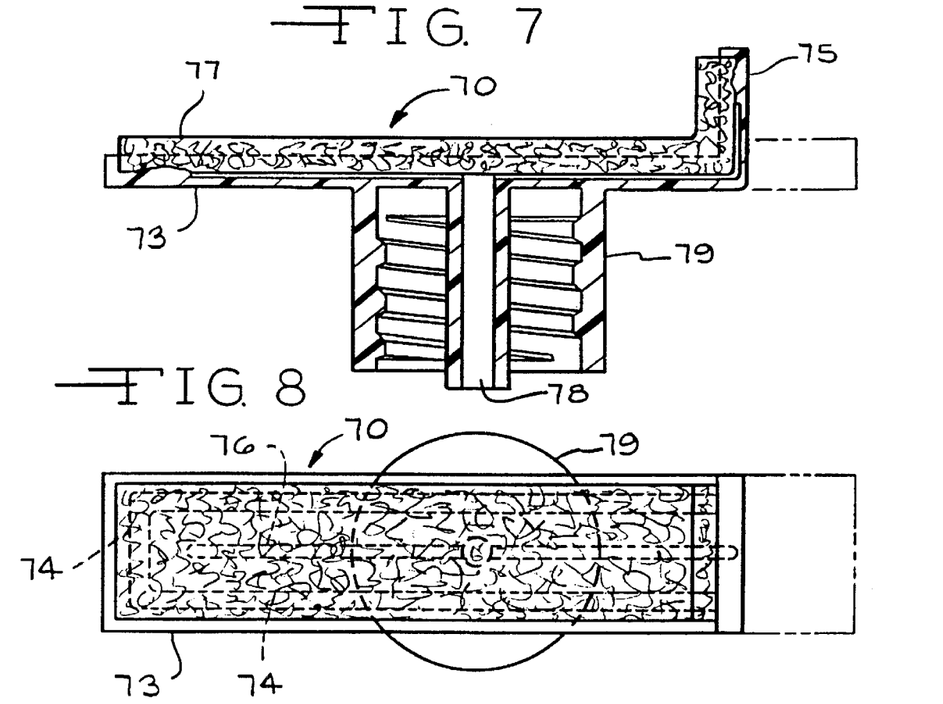
FIG. 7 is a cross-sectional view of another applicator tip of the present invention.
FIG. 8 is a plan view, partially in phantom, of the applicator tip of FIG. 7.

FIGS. 7 and 8 show an applicator tip 70 that has a substantially rectangular base 73 that is formed of a thermoplastic material as previously described. Fluid application material 77 is secured to the rectangular base 73 in the manner previously disclosed. The area of thermal bonding between the base 73 and the fluid application material 77 is shown by dashed line 74. In this applicator tip, a portion of the rectangular base 73 has been subjected to heat so that at least a portion of the base 73 can be moved or deformed to create a flange 75 on one end of the rectangular base 73. Since the fluid application material 77 was already secured to the base 73, the fluid application material moves with and is substantially positioned along the flange 75. In FIGS. 7 and 8, the broken line on the right side of the figures represents the original position for the base 73 prior to deforming or changing the position of the base. A threaded closure 79 has also been secured to the base 73. A channel 76 can be positioned in the center of the base 73 that is in communication with a fluid supply aperture 78 that extends through the base. The channel 76 acts to assist in distributing fluid along the fluid application material 77.

Figure 9:
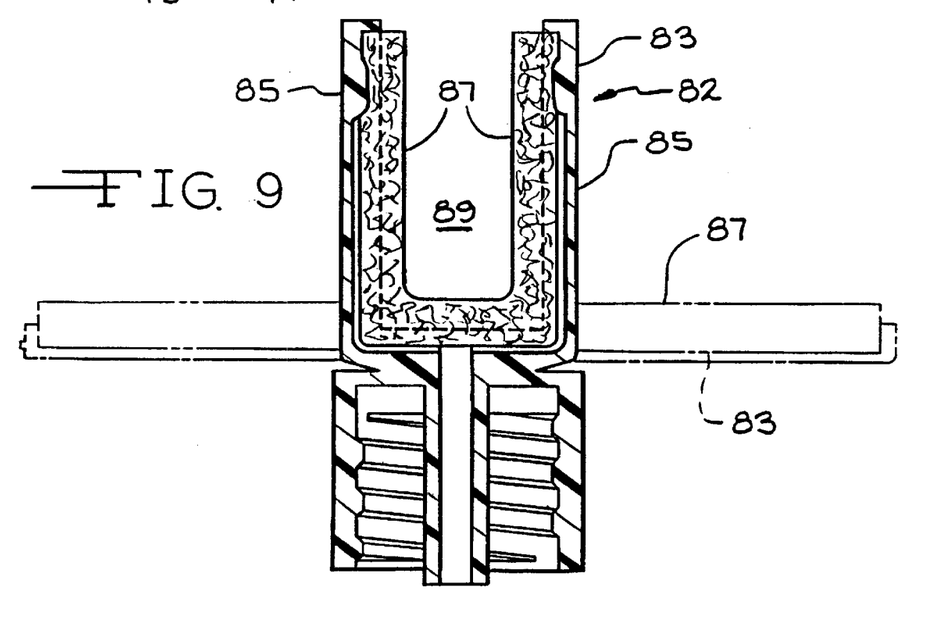
FIG. 9 is a cross-sectional view of another feature of the invention.

FIG. 9 shows an applicator tip 82 having a base 83 formed of thermoplastic material as previously described. The base 83 can be rectangular, as shown in FIGS. 7 and 8, or circular, as shown in FIGS. 1–4. A fluid application material 87 is secured to the base 83 in the manner previously described. The original position for the base 83 and the fluid application material 87 is shown in the broken lines in FIG. 9. As previously described, the base 83 is subjected to a source of heat that softens the thermoplastic material of the base so that the base can be moved or deformed to form legs 85. Since the fluid application material 87 was already secured to the base 83, the fluid application material was moved with the base 83 and is secured to the legs 85. The legs 85 and the fluid application material 87 define a U-shaped channel 89 that can be utilized to apply fluid to an object (not shown) positioned in the U-shaped channel 89.

Figure 10:
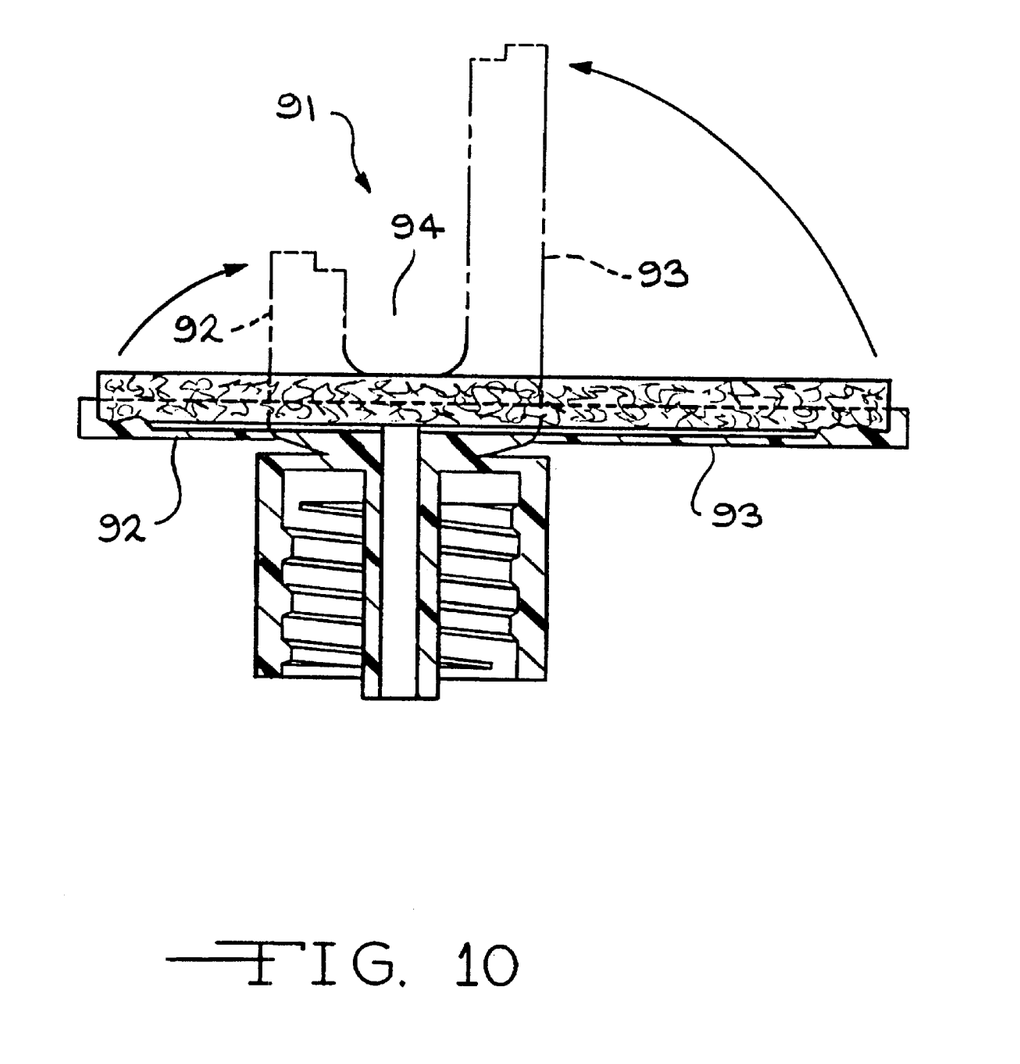
FIG. 10 is a cross-sectional view of the invention.
Figure 11:
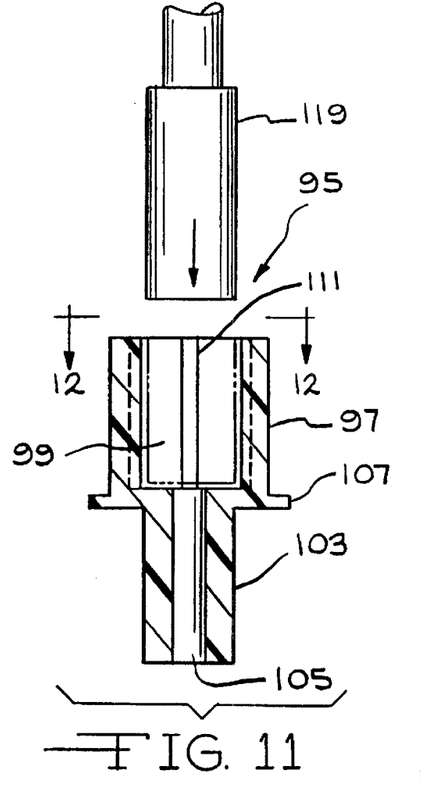
FIG. 11 is an exploded cross-section view of another feature of the invention.
Figure 12:
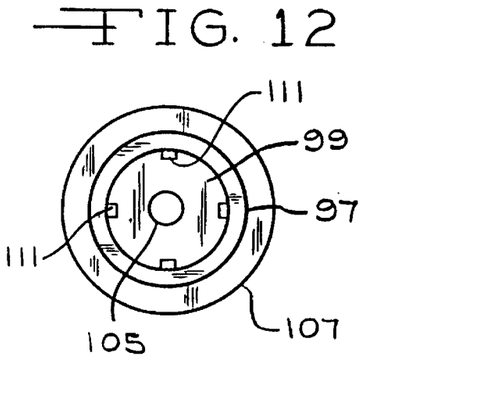
FIG. 12 is a plan view taken along line 12—12 in FIG. 11.
Figure 13:
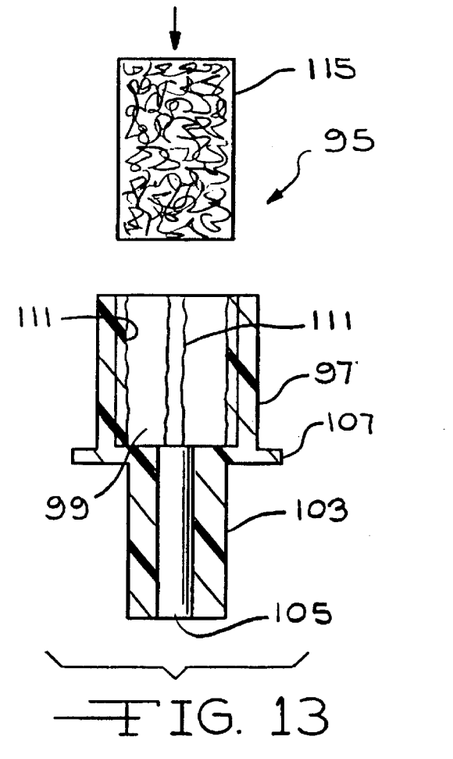
FIG. 13 is an exploded cross-sectional view.
Figure 14:
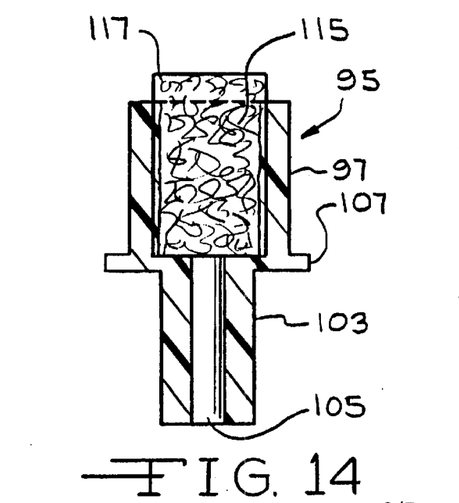
FIG. 14 is a cross-sectional view of another feature of the invention.

FIG. 10 shows an applicator tip 91 that is substantially similar to the applicator tip 82 shown in FIG. 9. However, for the applicator tip 91 shown in FIG. 10, there is a first leg 92 and a second leg 93 that form a U-shaped channel 94. In this embodiment, the first leg 92 is shorter than the second leg 93 and applies a different pattern of fluid to an object that the applicator tip 82 of FIG. 9. In FIG. 10, the broken lines show the position of the first leg 92 and the second leg 93 after the applicator tip 91 has been heated and formed to the desired shape.

Figure 6:
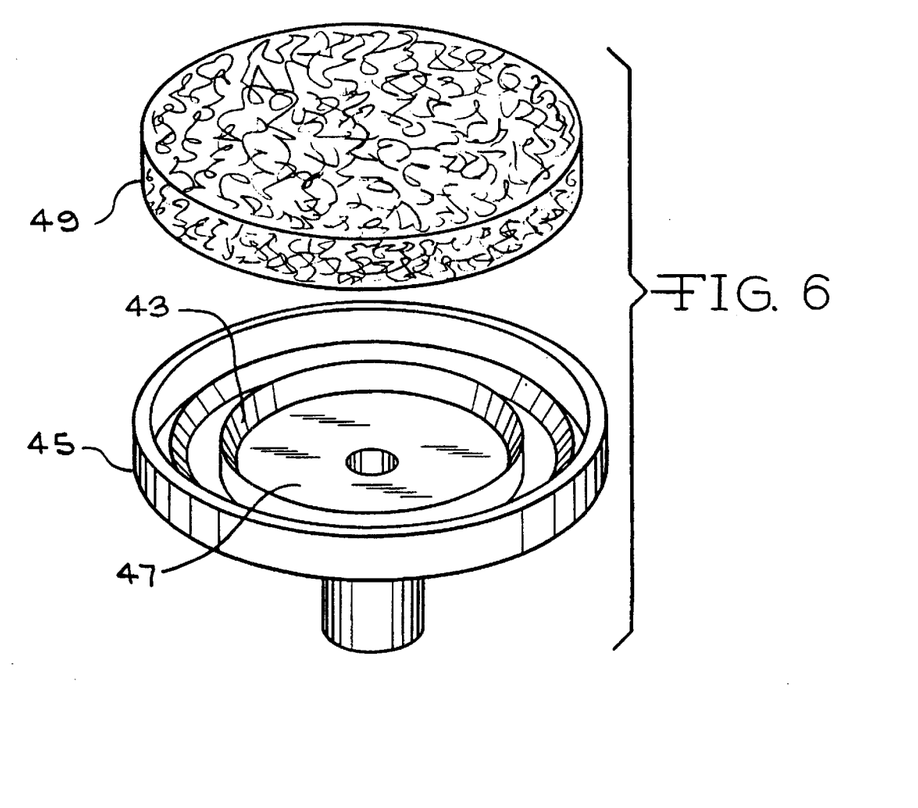
FIG. 6 is an exploded perspective view of another feature of the invention.

FIG. 6 shows a variation of the applicator tip of the present invention as shown in FIGS. 1–4 where a second raised portion 43 has been positioned on the first surface 47 of the base 45. The fluid application material 49 is secured to the base 45 in the same manner as previously described. However, in this example the second raised section 43 is also caused to become molten and also thermally bonds to the fluid application material 49.

Figure 5:
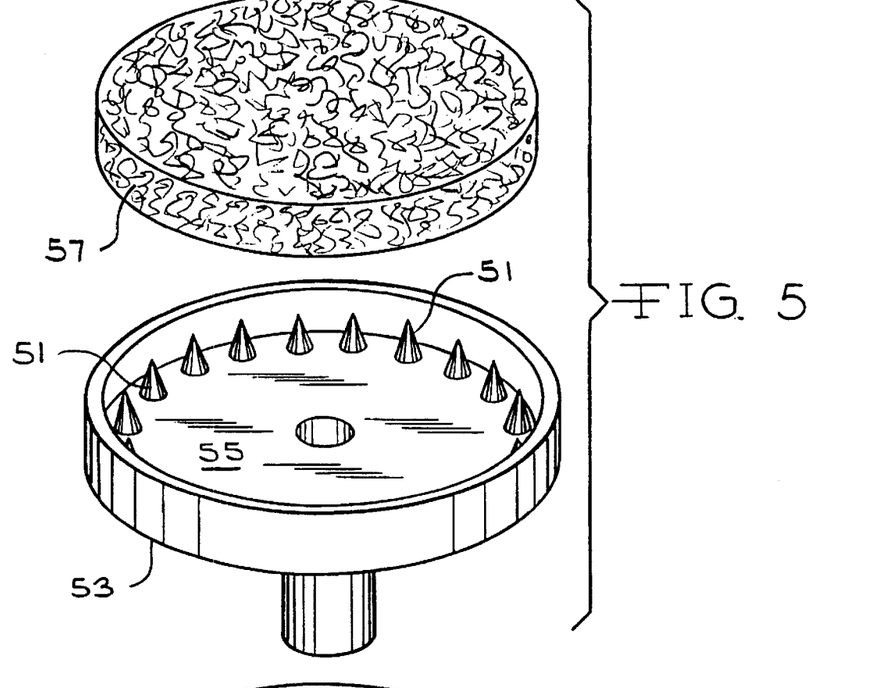
FIG. 5 is an exploded perspective view of another feature of the invention.

FIG. 5 shows another variation of the invention where a plurality of dimples 51 are positioned on the first surface 55 of the base 53. The dimples 51 are subjected to heat as previously described to become molten or semimolten. The molten dimples 51 contact the fluid application material 57, as previously described, to bond the fluid application material to the base 53.

FIGS. 11–14 show another variation of a fluid applicator tip where the applicator tip 95 has a cylindrical body 97 that defines a chamber 99. The cylindrical body 97 has a fluid supply port 103 that extends from one side of the cylindrical body. A fluid supply passageway 105 extends through the fluid supply port and is in communication with the chamber 99. A shoulder 107 can be positioned between the cylindrical body 97 and the fluid supply port 103.

A plurality of ribs 111 are positioned in the chamber 99 of the cylindrical body 97. It is to be understood that the ribs can have substantially the same shape and size as the previously discussed raised portion 23 described in FIGS. 1–4. A fluid application material 115 is positioned in the chamber 99 to apply fluid to an object (not shown). To secure the fluid application material 115 to the chamber 99, a source of heat 119 is positioned in the chamber 99 immediately adjacent the ribs 111. The source of heat 119 is sufficient to cause the ribs 111 to become molten or semi-molten. The source of heat 119 is then removed once the ribs 111 become molten or semimolten. The fluid application material 115 is positioned in the chamber 99 while the ribs 111 are still molten or semimolten. The ribs 111 thermally bond to the fluid application material 115 as previously described and secure the fluid application material 115 to the chamber 99 of the applicator tip 95. A portion 117 of the fluid application material 115 that extends from the chamber 99 is used to apply a layer of fluid to the object.

FIGS. 15 through 18 show another feature of the applicator of the present invention. The applicator tip 121 has a base 125 that includes a threaded closure 129 as previously described. The base is formed of a thermoplastic material such as HDPE or polypropylene. Positioned on the top of the base 125 is a cavity 135. The cavity 135 is defined by opposed side walls 137 and opposed end walls 139. A locating tab 143 can be disposed to extend from one end wall 139 in a direction away from the base 125. The locating tab 143 can be used to position the applicator tip in the desired location on the object that is to be coated. The cavity 137 is formed usually of the same thermoplastic material that is used to form the base 125. A fluid application material 145 is positioned in the cavity 135 so that at least a portion of the fluid application material 145 extends from the cavity 135 in a direction that is away from the base 125. The fluid application material 145 is the same as the fluid application material previously disclosed in this patent application. At least one aperture 151 extends through the base 125 and the at least one aperture 151 is in fluid communication with a supply port 159 positioned in the base of the cavity 135 that is adjacent the base 125. The aperture 151 and supply port 159 act to define a passageway for supplying fluid to the applicator tip in a manner as previously described. The cavity 135 has been described as being substantially rectangular in shape. However, it should be appreciated that the cavity 135 can have substantially any geometric shape depending on the end use applications for the applicator tip. On each opposed side wall 137 of the cavity 135, there is an indentation 161 where a portion of the side walls 137 have been heated and then deformed or moved in a direction toward the fluid application material 145 to securely bond the fluid application material in the cavity 135. The thermoplastic material of the side walls 137 is heated to an extent where the material becomes flowable and sticky through the entire thickness of the side wall in the region of the indentation 161. The heat that is applied to the side walls 137 will also cause the fluid application material 145 to become flowable and sticky in the region that is adjacent the indentation 161. When the indentations 161 are formed, the thermoplastic material of the side walls 137 is moved in a direction towards the fluid application material 145. The flowable plastic material of the side walls 137 and the flowable material of the fluid application material 145 merge together and form a bond that secures the fluid application material in the cavity 135.

Figure 15:
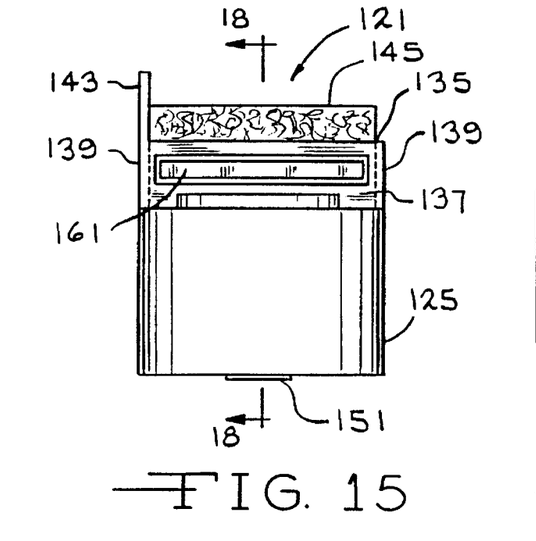
FIG. 15 is a side elevation view of another feature of the applicator tip invention.
Figure 16:
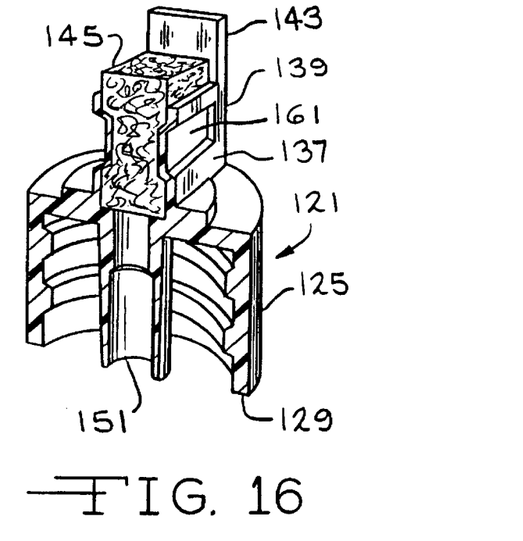
FIG. 16 is a perspective cross-sectional view of the applicator tip of FIG. 15.

In some applications, the fluid application material 145 may not be a material that is readily flowable. Examples of such non-flowable materials could be wool or other natural materials that do not become flowable upon the application of heat. In such applications, it is important that the material of the sidewalls 137 be made sufficiently flowable such that the material 137 can penetrate the fluid application material 145 to a sufficient degree whereby the fluid application material 145 merges with the material of the sidewall 137 and is bonded to the cavity 135 when the material of the sidewalls 137 is sufficiently cool to no longer be flowable.

The indentation 161 shown in FIG. 15 is substantially rectangular in shape. However, it should be noted that other geometric shapes could be used for the indentation 161 and that the indentation can be positioned anywhere around the outer periphery of the cavity 135. The position and size of the indentation 161 will be dictated by the configuration of the cavity and the requirements to form a strong bond between the cavity 135 and the fluid application material 145. As an example, the indentations 161 could extend along the entire length of the side walls 137 of the cavity 135 for the applicator tip shown in FIG. 15. The indentation 161 could also extend around the entire perimeter of the cavity 135. If the indentations 161 extend around substantially the entire outer periphery of the cavity 135 there will be a bond between the side wall of the cavity and the fluid application material 145 that will prevent the fluid that is being applied from moving between the fluid application material 145 and the side walls of cavity. The indentation 161 could also be a relatively thin line of plastic that is moved in a direction towards the fluid application material 145. This would give a relatively small contact area where the material of the side walls of the cavity 135 have been moved towards and merged with the fluid application material 145 to secure the fluid application material in the cavity 135. However, depending on the application, such a thin line contact could provide acceptable bonding of the fluid application material 145 to the cavity 135.

Figure 17:
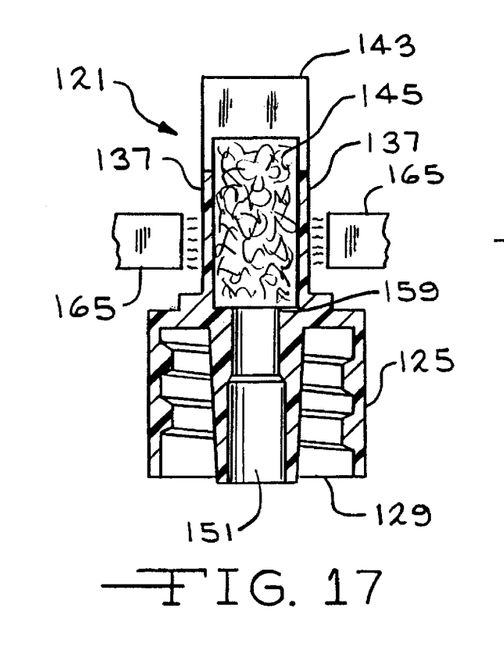
FIG. 17 is a cross-sectional view of the applicator tip of FIG. 15 with the heating element positioned adjacent the applicator tip.
Figure 18:
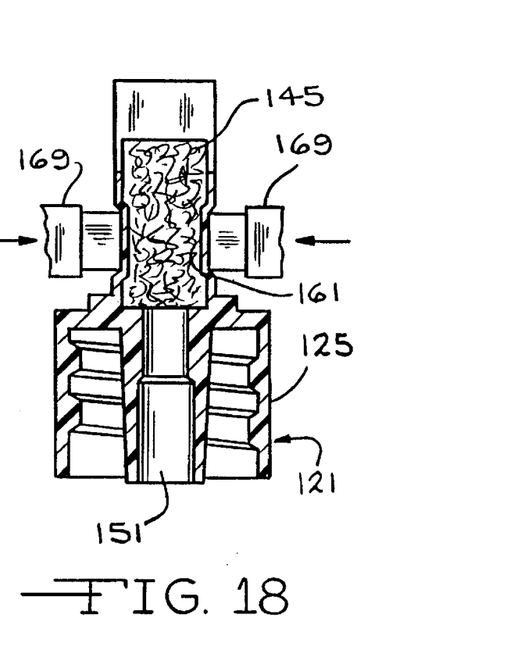
FIG. 18 is a cross-sectional view of the applicator tip of FIG. 15 with chill blocks positioned adjacent the applicator tip.

FIGS. 17 and 18 show one method whereby the fluid application material 145 can be bonded to the cavity 135 in the applicator tip 121. In FIG. 17, a heating element 165 is positioned immediately adjacent the opposed side walls 137 of the cavity 135. The heating elements 165 are usually spaced to be as close to the sidewalls as possible without actually touching the sidewalls. The heating elements 165 have a configuration and dimension that is substantially the same as the shape of the indentation 161 shown in FIG. 15. The heating elements 165 are spaced from the side walls 137 and direct heat to the portion of the side walls that are substantially defined by the indentation 161. Heat from the heating elements 165 is directed toward the opposed side walls 137 until the plastic material in the side walls becomes flowable and sticky. It is necessary that the heating elements 165 heat the plastic material through the entire thickness of the side walls 137. The heat from the heating elements 165 should also heat a portion of the fluid application material 145 that is immediately adjacent the area defined by the indentations 161. It is important that a high temperature heat source be used to quickly heat the desired area on the sidewall 137 of the cavity 135. If the heat source is directed at the sidewall 137 for too long of a period of time, the heat will migrate to other areas of the sidewall and fluid application material 145. In practice, it has been found that a heating element that can direct heat at the sidewall at a temperature of from about 600° to 900° F. works well for most thermoplastic materials that are used for the sidewalls 137 of the cavity 135. This temperature is usually directed at the sidewalls for a time period of from about 1 to 8 seconds. Of course, the temperature of the heat directed at the sidewalls and the duration of the time that the heat is directed at the sidewalls will vary depending on the material and thickness of the material used for the sidewalls 137 of the cavity 135.

After the side walls 137 and fluid application material 145 are sufficiently heated, the heating elements 165 are removed. Next, chill blocks 169, as shown in FIG. 18, are moved into position to engage the side walls 137 of the cavity 135. The chill blocks 169 have a configuration and dimension that is substantially the same as the indentation 161 that is formed in the side walls 136. The chill blocks 169 engage the side walls 137 and advance the side walls in a direction toward the fluid application material 145 to form the indentation 161 on the sidewalls 137. The advancement of the chill blocks 169 causes the flowable and sticky plastic material of the side walls 137 to merge with the flowable and sticky material of the fluid application material 145. The chill blocks 169 are pressed against the sidewalls 137 with a force adequate to form the indentations. In most applications, very little force is necessary to move the chill blocks to form the indentations. The chill blocks are moved a set distance to form the indentations. The chill blocks are also designed to remove heat from the side walls and fluid application material so that the plastic material of the side walls 137 that is merged with the fluid application material 145 becomes solid and a firm bond is formed between the cavity 135 and the fluid application material 145. The chill blocks 169 have a cooling feature so that the chill blocks stay cool when they contact the sidewalls 137 of the cavity 135. The chill blocks need to be cool so that they can remove heat from the sidewalls 137 and the fluid application material 145 to solidify these components to the fluid application material to the cavity. The chill blocks must also stay cool so that the chill blocks do not stick to the sidewalls of the cavity. Since the chill blocks 169 are removing heat, it is important that the chill blocks are rapidly pressed against the sidewalls 137 of the cavity 135 to move the sidewalls towards the fluid application material 145 before the material of the sidewalls cools sufficiently and is no longer flowable. It is preferable that the chill blocks remove the heat in a manner whereby the temperature of the chill blocks is not substantially increased. To so remove the heat it is desired that there is a mechanism that removes the heat from the chill blocks 169.

The shape of the heating elements 165 and the chill blocks 169 can be changed to form the desired shape for the indentation 161 of the applicator tip 121. The heating elements 165 and chill blocks 169 can also be shaped so that they engage the proper portion of the side walls 137 of the cavity 135 regardless of the shape of the side wall of the cavity 135. If desired, a focusing element (not shown) can be positioned around the heating elements 165 so that the heat from the heating elements is directed substantially to the area of the side walls 137 of the cavity 135 in which the indentations 161 are to be formed. An example of a focusing means are blocks that are made from a reflective mask material that can be positioned adjacent the heating elements 165. The blocks will act to limit the area of the applicator tip 121 that is subjected to the heat from the heating elements.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An applicator tip for applying fluid to a surface of an object comprising:
   a base formed of a thermoplastic material having a substantially planar upper first surface and an opposing lower second surface;
   at least one aperture extending through said base;
   a fluid supply port operatively connected to said second surface of said base, said supply port being in communication with said at least one aperture in said base;
   a fluid application material positioned on said first surface of said base, said fluid application material being positioned to receive fluid that passes through said aperture from said fluid supply port, said fluid application material being positioned to apply said fluid to said surface on said object, a first portion of said fluid application material being secured to a first portion of said first surface of said base, which first portion of said base is caused to be molten or semimolten and fuses to said first portion of said fluid application material; and
   a second portion of said fluid application material and a second portion of said first planar surface of said base forming a fluid passage space for receiving said fluid wherein pressure from said fluid in said space causes said second portion of said fluid application material to move away from said second portion of said base such that said fluid flows through said space and substantially saturates said fluid application material.

2. The applicator tip of claim 1 wherein said first portion of said base contains a raised area of thermoplastic material that extends from said planar first surface which raised area is caused to be molten or semimolten and fuses to said first portion of said base.

3. The applicator tip of claim 2 wherein said raised area of thermoplastic material is positioned adjacent an outer perimeter of said base.

4. The applicator tip of claim 2 wherein said raised area of thermoplastic material is positioned at an outer perimeter of said base.

5. The applicator tip of claim 2 wherein said raised area of thermoplastic material has a height from about 0.005 to about 0.090 of an inch and a width from about 0.005 to about 0.090 of an inch.

6. The applicator tip of claim 2 wherein said raised area of thermoplastic material is formed as an integral part of said first surface of said base.

7. The applicator tip of claim 1 wherein at least an outer portion of said base that is adjacent said first portion of said base can be heated to form said base into a desired shape to apply fluid to a desired location on the surface of said object.

8. The applicator tip of claim 7 wherein said adjacent portion of said base is thermally formed to the desired shape after said fluid application material has been secured to said first portion of said first surface of said base.

9. The applicator tip of claim 2 wherein said raised area comprises a plurality of dimples.

10. The applicator tip of claim 2 wherein said raised area substantially extends around a perimeter of said base.

11. The applicator tip of claim 2 wherein more than one raised area is used to secure said fluid application material to said base.

12. The applicator tip of claim 2 wherein said base is cylindrical in shape and said first surface defines a chamber, said at least one aperture is in communication with said chamber, said raised area on said first surface of said base being at least one rib that is positioned on said first surface that defines said chamber, said fluid application material being positioned in said chamber and secured to said base by said rib that is caused to be molten and that fuses to said fluid application material.

13. An applicator tip for applying fluid to an object comprising:
   a base having at least one aperture extending through said base for connection to a supply of fluid;
   a cavity having at least one sidewall positioned on said base, said sidewall being made of a heat flowable plastic material; and
   a fluid application material positioned in said cavity, said fluid application material being secured to said cavity by a first portion of said sidewall that is caused to be flowable and fuses with a first portion of said fluid application material whereby said fluid application material is bonded to said cavity.

14. The applicator tip of claim 13 wherein said first portion of said cavity forms at least one indentation towards said fluid application material, said indentation forming said bond with said fluid application material.

15. The applicator tip of claim 14 wherein said indentation is in a thin line.

16. The applicator tip of claim 14 wherein said indentation extends substantially around a perimeter of said sidewall of said cavity.

17. The applicator tip of claim 13, wherein said sidewall has been caused to be flowable by a source of heat which has been positioned immediately adjacent said sidewall.

18. The applicator tip of claim 17, wherein said fluid application material has been caused to be bonded to said cavity by at least one chill block that is caused to be brought into contact with said sidewall.

19. A method for forming an applicator tip for applying fluid to a surface of an object comprising:

applying heat adjacent a first portion of a base formed of a thermoplastic material to cause said first portion to become molten or semimolten;

adhering a fluid application material to said molten or semimolten first portion of said base whereby said molten or semimolten thermoplastic material fuses with at least a first portion of said fluid application material; and, forming a fluid passage space between a second portion of said fluid application material and a second portion of said base for receiving said fluid wherein pressure from said fluid in said space causes said second portion of said fluid application material to move away from said second portion of said base such that said fluid flows through said space and substantially saturates said fluid application material.

20. The method of claim 19 in which the heat is applied adjacent a raised area on said base which comprises said first portion of said base.

21. The method of claim 19 in which said heat is applied adjacent a plurality of dimples on said base which comprises said first portion of said base.

22. The method of claim 19 in which said fluid application material is positioned adjacent said first portion of said base prior to applying heat adjacent said first portion of said base.

23. The method of claim 22 in which said base forms a cavity and said heat is applied adjacent at least a portion of a sidewall of said cavity.

24. The method of claim 23 in which said heat causes said thermoplastic material comprising said portion of said sidewall adjacent said heat to become molten or semimolten and said fluid application material adjacent said molten or semimolten thermoplastic material of said portion of said sidewall also become molten or semimolten.

25. The method of claim 24 which said portion of said molten or semimolten thermoplastic material of said sidewall is advanced towards said molten or semimolten fluid application material to cause said portion of said thermoplastic material to merge and fuse with said fluid application material to bond said fluid application material to said base.

26. The method of claim 25 in which said portion of said sidewall forms an indentation in said thermoplastic material as said portion of said thermoplastic material is advanced towards said fluid application material.

27. The method of claim 26 in which said portion of said molten or semimolten thermoplastic material and fluid application material are rapidly cooled by removably applying at least one cold material to said portion of said base to advance said thermoplastic material towards said fluid application material.

28. The applicator tip of claim 7, wherein said outer portion of said base has a flange shape.

29. The applicator tip of claim 7, wherein said outer portion of said base has a U-shape.

30. The applicator tip of claim 7, wherein said outer portion of said base has a J-shape, which has a first leg that is shorter than a second leg.

31. The method of claim 27, in which said cold material contacts said portion of said base and forms an indentation in said portion of said base.

32. The method of claim 19, further including heating an outer portion of said base that is adjacent said first portion of said base to form said base into a desired shape to apply fluid to a desired location on said surface of said object.

33. The method of claim 32, in which said outer portion of said base has a flange shape.

34. The method of claim 32, in which said outer portion of said base has a U-shape.

35. The method of claim 32, in which said outer portion of said base has a J-shape which has a first leg that is shorter than a second leg.

* * * * *